(12) United States Patent
Wei et al.

(10) Patent No.: US 11,460,345 B2
(45) Date of Patent: *Oct. 4, 2022

(54) CAVITY BLACKBODY RADIATION SOURCE AND METHOD OF MAKING THE SAME

(71) Applicants: Tsinghua University, Beijing (CN); HON HAI PRECISION INDUSTRY CO., LTD., New Taipei (TW)

(72) Inventors: Yang Wei, Beijing (CN); Guang Wang, Beijing (CN); Shou-Shan Fan, Beijing (CN)

(73) Assignees: Tsinghua University, Beijing (CN); HON HAI PRECISION INDUSTRY CO., LTD., New Taipei (TW)

(*) Notice: Subject to any disclaimer, the term of this patent is extended or adjusted under 35 U.S.C. 154(b) by 942 days.

This patent is subject to a terminal disclaimer.

(21) Appl. No.: 16/198,549

(22) Filed: Nov. 21, 2018

(65) Prior Publication Data
US 2019/0212199 A1 Jul. 11, 2019

(30) Foreign Application Priority Data
Jan. 11, 2018 (CN) .......................... 201810027827.X (51) Int. Cl.
*G01J 5/53* (2022.01)
*G01J 5/04* (2006.01)
(Continued)

(52) U.S. Cl.
CPC .................. *G01J 5/53* (2022.01); *G01J 5/023* (2013.01); *G01J 5/046* (2013.01); *G01J 5/80* (2022.01)

(58) Field of Classification Search
CPC .... G01J 5/22; G01J 5/023; G01J 5/046; G01J 5/00; G01J 2005/0048
See application file for complete search history.

(56) References Cited

U.S. PATENT DOCUMENTS 8,741,422 B2 6/2014 Miao
9,568,372 B2* 2/2017 Ji .............................. G01J 5/522
(Continued)

FOREIGN PATENT DOCUMENTS

| CN | 2622629 | 6/2004 |
| CN | 101400198 | 4/2009 |

(Continued)

OTHER PUBLICATIONS

Kohei Mizuno et al. A black body absorber from vertically aligned single-walled carbon nanotubes, Proceedings of the Natinal Academy of Sciences, Apr. 14, 2009, vol. 106, 6044-6047.

(Continued)

*Primary Examiner* — Lisa M Caputo
*Assistant Examiner* — Janice M Soto
(74) *Attorney, Agent, or Firm* — ScienBiziP, P.C.

(57) ABSTRACT

A cavity blackbody radiation source is provided. The cavity blackbody radiation source comprises a blackbody radiation cavity and a carbon nanotube composite material. The blackbody radiation cavity comprises an inner surface. The carbon nanotube composite material is located on the inner surface. The carbon nanotube composite material comprises a black lacquer and a plurality of carbon nanotubes, and the plurality of carbon nanotubes is dispersed in the black lacquer.

15 Claims, 4 Drawing Sheets

(51) Int. Cl.
*G01J 5/02* (2022.01)
*G01J 5/80* (2022.01)

(56) References Cited

U.S. PATENT DOCUMENTS

| | | | |
|---|---|---|---|
| 2008/0192797 A1* | 8/2008 | Ko | G05D 23/19 |
| | | | 374/2 |
| 2009/0085461 A1 | 4/2009 | Feng et al. | |
| 2009/0096348 A1 | 4/2009 | Liu et al. | |
| 2009/0321420 A1 | 12/2009 | Feng et al. | |
| 2011/0108545 A1 | 5/2011 | Wang et al. | |
| 2011/0217451 A1 | 9/2011 | Veerasamy | |
| 2011/0315882 A1 | 12/2011 | Hu et al. | |
| 2012/0060826 A1* | 3/2012 | Weisenberger | C08J 5/005 |
| | | | 126/569 |
| 2012/0104213 A1 | 5/2012 | Feng et al. | |
| 2012/0312773 A1 | 12/2012 | Cheng et al. | |
| 2013/0295320 A1* | 11/2013 | Liu | B32B 5/12 |
| | | | 428/113 |
| 2015/0367557 A1 | 12/2015 | Wei et al. | |
| 2017/0256406 A1* | 9/2017 | Cheng | H01L 21/0243 |

FOREIGN PATENT DOCUMENTS

| | | | | |
|---|---|---|---|---|
| CN | 101409961 | | 4/2009 | |
| CN | 102452647 | | 5/2012 | |
| CN | 103367553 A | * | 10/2013 | ....... H01L 21/02664 |
| CN | 103382023 | | 11/2013 | |
| CN | 103602132 | | 2/2014 | |
| CN | 105197875 | | 12/2015 | |
| CN | 105562307 | | 5/2016 | |
| CN | 105675143 | | 6/2016 | |
| CN | 107014494 | | 8/2017 | |
| JP | 2015-203589 | | 11/2015 | |
| JP | 2017-3565 | | 1/2017 | |
| JP | 2017-24942 | | 2/2017 | |
| TW | 200834046 | | 8/2008 | |
| TW | 201125419 | | 7/2011 | |
| TW | 201144217 | | 12/2011 | |
| TW | I410615 | | 10/2013 | |
| TW | I486090 | | 5/2015 | |
| TW | 201625937 | | 7/2016 | |
| WO | 2016/107883 | | 7/2016 | |

OTHER PUBLICATIONS

Shimizu et al., Blackbody Thermal Radiator with Vertically Alighned Carbon Nanotube Coating, Japanese Journal of Applied Physics, May 15, 2014, 068004-1~068004-3.

Kohei Mizuno et al., A Black Body Absorber from Vertically Aligned Single-walled Carbon Nanotubes, PNAS, Apr. 14, 2009, 6044-6047, vol. 106, No. 15.

Zhao Jun Han et al., Large-Diameter Single-Walled Carbon Nanotubes, J. Am. Chem. Soc., Mar. 12, 2012, 6018-6024, 134, 13.

Lim Zhi Han, Investigation of Laser-Carbon Nanotubes Interaction and Development of CNT-Based Devices, Ph.D Theses, Oct. 12, 2010, Check(https://scholar.google.com/scholar?as_q=&as_epq=Investigation of Laser-Carbon Nanotubes Interaction and Development of CNT-Based Devices&as_occt=any).

* cited by examiner

CAVITY BLACKBODY RADIATION SOURCE AND METHOD OF MAKING THE SAME

CROSS-REFERENCE TO RELATED APPLICATIONS

This application claims all benefits accruing under 35 U.S.C. § 119 from China Patent Application No. 201810027827.X, filed on Jan. 11, 2018, in the China Intellectual Property Office, the contents of which are hereby incorporated by reference. The application is also related to applications entitled, "CAVITY BLACKBODY RADIATION SOURCE", filed on Nov. 21, 2018 (application Ser. No. 16/198,565). The application is also related to applications entitled, "PLANE SOURCE BLACKBODY", filed on Nov. 21, 2018 (application Ser. No. 16/198,577). The application is also related to applications entitled, "CAVITY BLACKBODY RADIATION SOURCE AND METHOD OF MAKING THE SAME", filed on Nov. 21, 2018 (application Ser. No. 16/198,590). The application is also related to applications entitled, "CAVITY BLACKBODY RADIATION SOURCE AND METHOD OF MAKING THE SAME", filed on Nov. 21, 2018 (application Ser. No. 16/198,598). The application is also related to applications entitled, "PLANE SOURCE BLACKBODY", filed on Nov. 21, 2018 (application Ser. No. 16/198,606). The application is also related to applications entitled, "PLANE SOURCE BLACKBODY", filed on Jan. 10, 2019 (application Ser. No. 16/244,449). The application is also related to applications entitled, "BLACKBODY RADIATION SOURCE", filed on Jan. 10, 2019 (application Ser. No. 16/244,455). The application is also related to applications entitled, "BLACKBODY RADIATION SOURCE", filed on Jan. 10, 2019 (application Ser. No. 16/244,468). The application is also related to applications entitled, "BLACKBODY RADIATION SOURCE", filed on Jan. 10, 2019 (application Ser. No. 16/244,474). The application is also related to applications entitled, "BLACKBODY RADIATION SOURCE", filed on Jan. 10, 2019 (application Ser. No. 16/244,481). The application is also related to applications entitled, "PLANE SOURCE BLACKBODY", filed on Jan. 10, 2019 (application Ser. No. 16/244,488).

FIELD

The present disclosure relates to a cavity blackbody radiation source and a method for making the same.

BACKGROUND

With a rapid development of infrared remote sensing technology, the infrared remote sensing technology is widely used in military and civilian fields, such as earth exploration, weather forecasting, and environmental monitoring. However, all infrared detectors need to be calibrated by a blackbody before they can be used. The higher an emissivity of the blackbody, the higher an accuracy of a calibration of the infrared detector. An effective emissivity of a cavity blackbody mainly depends on an opening size of the cavity blackbody, a shape of the cavity blackbody, an emissivity of a material inside the cavity blackbody, and an isothermal degree in the cavity blackbody. Therefore, selecting high emissivity intracavity surface materials has a great significance for obtaining high performance blackbody radiation sources.

BRIEF DESCRIPTION OF THE DRAWINGS

Implementations of the present technology will now be described, by way of example only, with reference to the attached figures, wherein.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature which is described, such that the component need not be exactly or strictly conformed to such a feature. The term "comprise," when utilized, means "include, but not necessarily limited to"; it specifically indicates open-ended inclusion or membership in the so-described combination, group, series, and the like.

The disclosure is described in relation to a cavity blackbody radiation source. The cavity black body radiation source comprises a blackbody radiation cavity. The blackbody radiation cavity comprises an inner surface, and a carbon nanotube composite material provided on the inner surface. The carbon nanotube composite material comprises a black lacquer and a plurality of carbon nanotubes. The plurality of carbon nanotubes is dispersed in the black lacquer. The black lacquer has high emissivity, such as PYROMARK 1200 black lacquer having an emissivity 0.92, NEXTEL VELVET 811-21 black lacquer having an emissivity 0.95. A mass ratio of the plurality of carbon nanotubes in the carbon nanotube composite material ranges from about 1% to about 50%. In one embodiment, the mass ratio of the plurality of carbon nanotubes in the carbon nanotube composite material ranges from about 2% to about 10%.

The blackbody radiation cavity is made of a material resistant to high temperature and having a high emissivity. The blackbody radiation cavity can be made of hard aluminum material, aluminum alloy material or oxygen-free copper. The blackbody radiation cavity comprises a blackbody cavity and a blackbody cavity bottom. The blackbody cavity and the blackbody cavity bottom can be an integral structure. The blackbody cavity and the blackbody cavity bottom can also be two independent structures, and the blackbody cavity bottom can be pressed into or can be screwed into the blackbody cavity from an end opening of the blackbody cavity.

The blackbody cavity comprises a room. A cross section of the room can be circle, ellipse, triangle, quad, or other polygon. A shape of a bottom surface of the room is not limited. The shape of the bottom surface of the room can be a flat surface, a tapered surface, a prismatic surface, or other surfaces.

In one embodiment, the plurality of carbon nanotubes is in an upright state in the black lacquer, and the axial directions of the plurality of carbon nanotube are substantially perpendicular to the inner surface of the blackbody radiation cavity.

In one embodiment, the cavity blackbody radiation source further comprises a heating element. In one embodiment, the heating element comprises a carbon nanotube structure.

Figure 1:
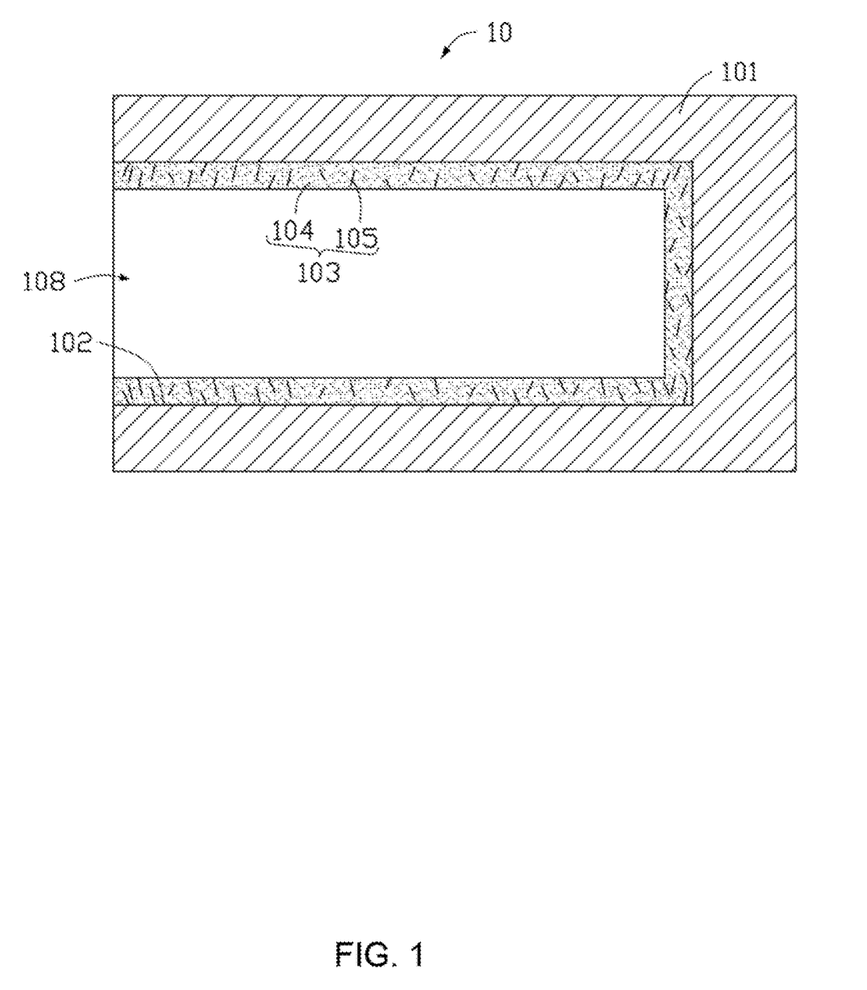
FIG. 1 is a section structure diagram of one embodiment of a cavity blackbody radiation source.

FIG. 1 shows one embodiment in relation to a cavity blackbody radiation source 10. The cavity black body radiation source 10 comprises a blackbody radiation cavity 101. The blackbody radiation cavity 101 comprises an inner surface 102. A carbon nanotube composite material 103 is located on the inner surface 102. The carbon nanotube composite material 103 comprises a black lacquer 104 and a plurality of carbon nanotubes 105. The plurality of carbon nanotubes 105 is dispersed and randomly arranged in the black lacquer 104. The black lacquer 104 is Pyromark 1200 black lacquer 104. A mass ratio of the plurality of carbon nanotubes 105 in the carbon nanotube composite material 103 is 2%.

The blackbody radiation cavity 101 is an integral cylindrical structure. A material of the blackbody radiation cavity 101 is an aluminum alloy. The blackbody cavity 101 comprises a room 108. The cavity 108 is cylindrical. A bottom surface of the cavity 108 is a flat surface.

The carbon nanotube composite material 103 is a layered structure having a flat surface and a large surface roughness.

The cavity blackbody radiation source 10 comprises a heating element. The heating element comprises a carbon nanotube structure, a first electrode and a second electrode, the first electrode and the second electrode are spaced apart from each other and are provided on a surface of the carbon nanotube structure. The carbon nanotube structure is wrapped or wound around an outer surface of the blackbody radiation cavity 101. The carbon nanotube structure comprises at least one carbon nanotube film or at least one carbon nanotube wire. The carbon nanotube structure comprises a plurality of carbon nanotubes connected end to end and arranged in a preferred orientation. The plurality of carbon nanotubes of the carbon nanotube structure extends from the first electrode to the second electrode.

Because the carbon nanotube structure is wrapped or wound around the outer surface of the blackbody radiation cavity 101, after the carbon nanotube structure is energized by the first electrode and the second electrode, the carbon nanotube structure can heat the whole blackbody radiation cavity 101. So that a temperature field inside the blackbody radiation cavity 101 is evenly distributed, the temperature stability and uniformity of the cavity blackbody radiation source 10 can be improved. Since carbon nanotube has small density and light weight, using the carbon nanotube structure as the heating element allows the cavity blackbody radiation source 10 to have a lighter weight. Since carbon nanotubes have high electrothermal conversion efficiency and low thermal resistance, and the carbon nanotube structure has small resistance; using the carbon nanotube structure to heat the blackbody radiation cavity has the characteristics of rapid temperature rise, small thermal hysteresis and fast heat exchange rate. Carbon nanotubes have excellent toughness, and thus the cavity blackbody radiation sources using the carbon nanotube structure as heating element have a long service life.

One embodiment is described in relation to a method of making the cavity blackbody radiation source 10. The method comprises:

block (B11), providing a blackbody radiation cavity and a carbon nanotube slurry, the blackbody radiation cavity comprises an inner surface, and the carbon nanotube slurry comprises a black lacquer and a plurality of carbon nanotubes;

block (B12), coating the carbon nanotube slurry on the inner surface, and drying the carbon nanotube slurry form carbon nanotube composite material.

In block (B11) providing a blackbody radiation cavity 101, the blackbody radiation cavity 101 is an integrally cylindrical structure. A material of the blackbody radiation cavity 101 is an aluminum alloy. The blackbody cavity 101 comprises a room 108. The cavity 108 is cylindrical. A bottom surface of the cavity 108 is a flat surface.

The carbon nanotube slurry comprises a black lacquer and a plurality of carbon nanotubes. The plurality of carbon nanotubes is dispersed and randomly arranged in the black lacquer. The black lacquer is Pyromark 1200 black lacquer. A mass ratio of the plurality of carbon nanotubes in the carbon nanotube composite material is 2%.

In block (B12), in the carbon nanotube composite material, the plurality of carbon nanotubes is uniformly dispersed in the black lacquer.

In one embodiment, the method further comprises putting the heating element on the outer surface of the blackbody radiation cavity 101, and the blackbody radiation cavity 101 can be heated in real time.

Figure 2:
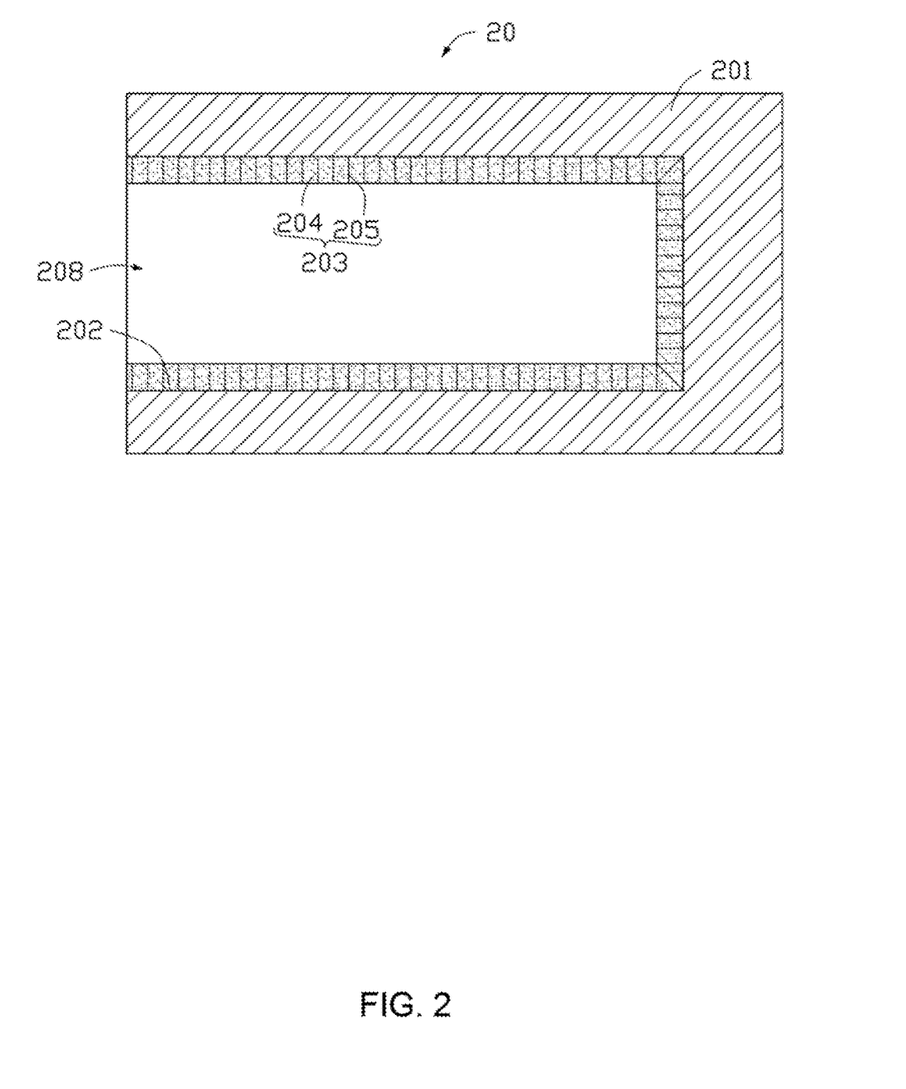
FIG. 2 is a section structure diagram of one embodiment of a cavity blackbody radiation source.

FIG. 2 shows one embodiment in relation to a cavity blackbody radiation source 20. A structure of the cavity black body radiation source 20 is substantially the same as that of the cavity black body radiation source 10. The cavity blackbody radiation source 20 comprises a blackbody radiation cavity 201. The blackbody radiation cavity 201 comprises a room 208. The blackbody radiation cavity 201 comprises an inner surface 202. A carbon nanotube composite material 203 is provided on the inner surface 202. The carbon nanotube composite material 203 comprises a black lacquer 204 and a plurality of carbon nanotubes 205. The plurality of carbon nanotubes 205 remain in an upright state in the black lacquer 204, and the axial directions of the plurality of carbon nanotube 205 are substantially perpendicular to the inner surface of the blackbody radiation cavity 201.

The plurality of carbon nanotubes 205 remains in the upright state in the black lacquer 204, adjacent carbon nanotubes 205 are nearly parallel and form a gap. When light rays are incident on the black body radiation cavity 201, the light rays are reflected back and forth by the adjacent carbon nanotubes 205 in the gap, and the light rays emitted from the black body radiation cavity 201 are greatly reduced, so an emissivity of the carbon nanotube composite material 203 is further improved.

In one embodiment, the plurality of carbon nanotubes 205 remains in the upright state in the black lacquer 204 by a first method. The first method comprises bonding an adhesive tape to a surface of the carbon nanotube composite material 203; heating the adhesive tape at a certain temperature to make the plurality of carbon nanotubes 205 stuck by the tape; removing the tape at the certain temperature to pull up the plurality of carbon nanotubes 205, and make the plurality of carbon nanotubes 205 erect and substantially perpendicular to the inner surface of the blackbody radiation cavity 201.

In one embodiment, the plurality of carbon nanotubes 205 remains in the upright state in the black lacquer 204 by a second method. The second method comprises pouring liquid glue onto a surface of the carbon nanotube composite material 203 and flowing flat the liquid glue on the surface of the CNT composite; curing the liquid glue, and a method of curing depends on a nature of the liquid glue; and removing the cured liquid glue on the surface of the carbon nanotube composite material 203 to make the plurality of carbon nanotubes 205 erect and substantially perpendicular to the inner surface of the blackbody radiation cavity 201. The cured liquid glue can be removed by tweezers or other tools.

Figure 3:
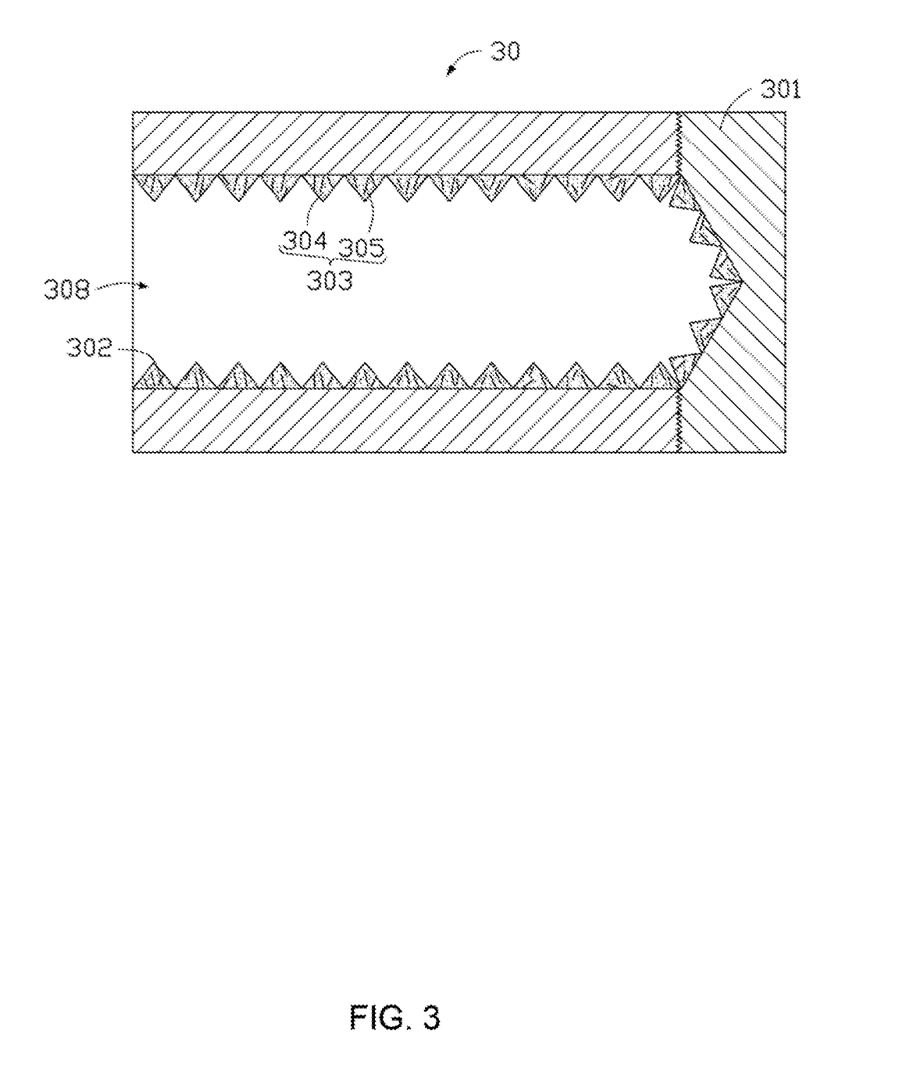
FIG. 3 is a section structure diagram of one embodiment of a cavity blackbody radiation source.

FIG. 3 shows one embodiment in relation to a cavity blackbody radiation source 30. The cavity black body radiation source 30 comprises a blackbody radiation cavity 301. The blackbody radiation cavity 301 comprises a room 308. The blackbody radiation cavity 301 comprises an inner surface 302. A carbon nanotube composite material 303 is located on the inner surface 302. The carbon nanotube composite material 303 comprises a black lacquer 304 and a plurality of carbon nanotubes 305. The plurality of carbon nanotubes 305 is dispersed and randomly arranged in the black lacquer 304. A surface of the carbon nanotube composite material 303 comprises a plurality of microstructures. The plurality of microstructures can be a strip protrusion or a dot protrusion. A cross-sectional shape of the strip protrusion comprises triangular, trapezoidal, square, and the like. A cross-sectional shape of the dot protrusion comprises triangular, trapezoidal, square, and the like. In one embodiment, the plurality of microstructures is a plurality of dot protrusions, and each of the plurality of dot protrusions is a triangular pyramid. The black lacquer 304 is NEXTEL VELVET 811-21 black lacquer, and an emissivity of the NEXTEL VELVET 811-21 black lacquer is about 0.95. A mass ratio of the plurality of carbon nanotubes 305 in the carbon nanotube composite material 303 is 5%.

A material of the blackbody radiation cavity 301 is an aluminum alloy. The blackbody radiation cavity 301 comprises a blackbody cavity and a blackbody cavity bottom. The blackbody cavity and the blackbody cavity bottom can also be two independent structures, and the blackbody cavity bottom is screwed into the blackbody cavity by a screw thread. A cross section of the room 308 is a circular, and a bottom surface of the room 308 is a tapered surface.

In one embodiment, the cavity blackbody radiation source 30 further comprises a heating element. The heating element comprises a carbon nanotube structure.

When all conditions except the internal surface area of the cavity blackbody radiation source are the same, the larger the internal surface area of the blackbody radiation cavity, the higher the emissivity of the blackbody radiation cavity. All conditions comprise a material of the blackbody radiation cavity, the inner surface material of the blackbody radiation cavity, a diameter of the blackbody radiation cavity, and the like. The surface of the carbon nanotube composite material 303 comprises a plurality of microstructures, and thus the internal surface area of the blackbody radiation cavity 301 is increased, and further the emissivity of the cavity blackbody radiation source 30 is increased.

One embodiment is described in relation to a first method of making the cavity blackbody radiation source 30. The first method comprises:
  block (B21), providing a blackbody radiation cavity and a carbon nanotube slurry, the blackbody radiation cavity comprises an inner surface, and the carbon nanotube slurry comprises a black lacquer and a plurality of carbon nanotubes;
  block (B22), coating the carbon nanotube slurry on the inner surface, and drying the carbon nanotube slurry to form a carbon nanotube composite material; and
  block (B23), forming a plurality of microstructures on the surface of the carbon nanotube composite material.

In block (B21), providing a blackbody radiation cavity 301. The blackbody radiation cavity 301 comprises a blackbody cavity and a blackbody cavity bottom. The blackbody cavity bottom is screwed into the blackbody cavity by a screw thread. The blackbody radiation cavity 301 comprises an inner surface, and the inner surface is a smooth surface. The blackbody radiation cavity 301 comprises a cylindrical room 308. A bottom surface of the cylindrical room 308 is a tapered surface.

The carbon nanotube slurry comprises a black lacquer and a plurality of carbon nanotubes. The plurality of carbon nanotubes is dispersed in the black lacquer. The black lacquer 304 is NEXTEL VELVET 811-21 black lacquer, and an emissivity of the NEXTEL VELVET 811-21 black lacquer is about 0.95. A mass ratio of the plurality of carbon nanotubes in the carbon nanotube slurry is 5%.

In block (B22), coating the carbon nanotube slurry on the inner surface, and drying the carbon nanotube slurry to form the carbon nanotube composite material. In the carbon nanotube composite material, the plurality of carbon nanotubes is uniformly dispersed in the black lacquer.

In block (B23), the step of forming the plurality of microstructures on the surface of the carbon nanotube composite material is performed by a laser irradiation. The laser beam spot diameter, power, and scanning speed are determined by the shape and size of the plurality of microstructures. In one embodiment, providing a laser, an irradiation path of a laser beam from the beam can be controlled by a computer program; irradiating the surface of the carbon nanotube composite material by the laser, to form a plurality of triangular pyramids on the surface of the carbon nanotube composite material.

The first method can further comprise putting the heating element on the outer surface of the blackbody radiation cavity 301. The blackbody radiation cavity 301 can be heated in real time.

One embodiment is described in relation to a second method of making the cavity blackbody radiation source 30. The second method comprises:
  block (B31), providing a blackbody radiation cavity and a carbon nanotube slurry, the blackbody radiation cavity comprises an inner surface, and the inner surface comprises a plurality of microstructures; and the carbon nanotube slurry comprises a black lacquer and a plurality of carbon nanotubes; and
  block (B32), coating the carbon nanotube slurry on the inner surface, and drying the carbon nanotube slurry to form a carbon nanotube composite material;

The block (B31) is substantially the same as the block (B21) except that the inner surface comprises a plurality of microstructures, the plurality of microstructures is a plurality of triangular pyramid, and a non-flat concave tapered groove is formed at a bottom end connection between adjacent triangular pyramids.

In block (B32), a surface of each of the plurality of triangular pyramids is coated with the carbon nanotube slurry, but the carbon nanotube slurry does not completely cover the plurality of triangular pyramids, and a shape of each of the plurality of triangular pyramids remains. Drying the carbon nanotube slurry to form a layer of carbon nanotube composite material on the surface of each of the plurality of triangular pyramid. That is, a plurality of triangular pyramids is formed on a surface of the carbon nanotube composite material.

The plurality of microstructures can be a strip protrusion or a dot protrusion. A cross-sectional shape of the strip protrusion can be triangular, trapezoidal, square, or the like. A cross-sectional shape of the dot protrusion can be triangular, trapezoidal, square, or the like.

Figure 4:
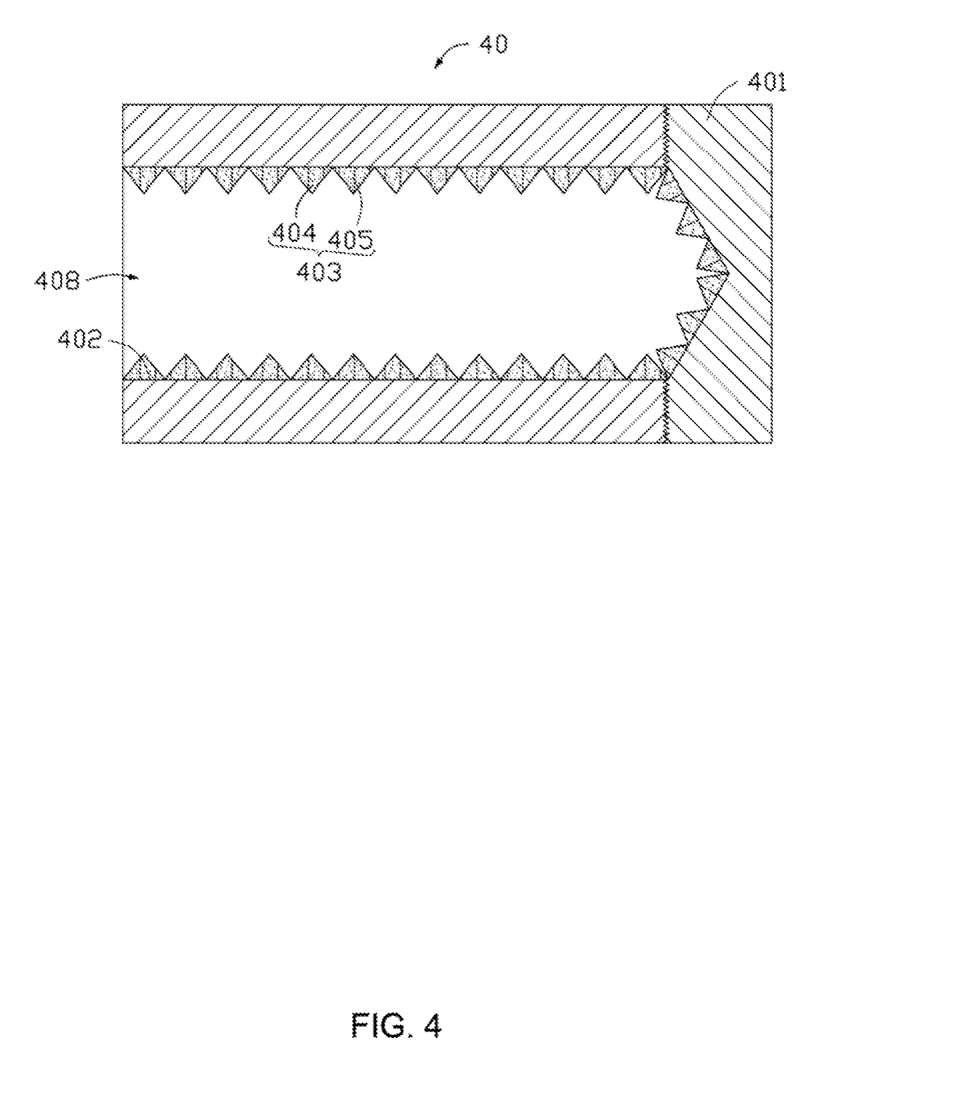
FIG. 4 is a section structure diagram of one embodiment of a cavity blackbody radiation source.

FIG. 4 shows one embodiment in relation to a cavity blackbody radiation source 40. A structure of the cavity black body radiation source 40 is substantially the same as that of the cavity black body radiation source 30. The cavity black body radiation source 40 comprises a blackbody radiation cavity 401. The blackbody radiation cavity 401 comprises a room 408. The blackbody radiation cavity 401 comprises an inner surface 402. A carbon nanotube composite material 403 is located on the inner surface 402. The carbon nanotube composite material 403 comprises black lacquer 404 and a plurality of carbon nanotubes 405. A surface of the carbon nanotube composite material 43 comprises a plurality of microstructures. The plurality of microstructures is a dot protrusion. The dot protrusion is a triangular pyramid. A mass ratio of the plurality of carbon nanotubes 405 in the carbon nanotube composite material 403 is 5%. The black lacquer 304 is NEXTEL VELVET 811-21 black lacquer, and an emissivity of the NEXTEL VELVET 811-21 black lacquer is about 0.95. The plurality of carbon nanotubes 405 remain in an upright state in the NEXTEL VELVET 811-21 black lacquer, and the axial directions of the plurality of carbon nanotube 405 are substantially perpendicular to the inner surface of the blackbody radiation cavity 401.

The plurality of carbon nanotubes 405 remain in the upright state in the black lacquer 404, adjacent carbon nanotubes 405 are nearly parallel and form a gap. When light rays are incident on the black body radiation cavity 401, the light rays are reflected back and forth by the adjacent carbon nanotubes 405 in the gap, and the light rays emitted from the black body radiation cavity 401 are greatly reduced, so an emissivity of the carbon nanotube composite material 403 is further improved.

A method of making the plurality of carbon nanotubes 405 remain in the upright state in the black lacquer 404 is the same with the method of making the plurality of carbon nanotubes 205 remain in the upright state in the black lacquer 204.

The cavity blackbody radiation source in this disclosure has many advantages. First, carbon nanotubes are currently the darkest material in the world, the emissivity of carbon nanotubes is 99.6%, which is far larger than that of currently surface material of the inner wall of the black body cavity. For example, an emissivity of the NEXTEL VELVET 81-21 black lacquer is only 96%. Therefore, the emissivity of carbon nanotube composites comprising the carbon nanotubes and black lacquer is also larger than that of the surface material of currently inner wall of the blackbody cavity.

Second, currently, the cavity blackbody radiation source obtains a larger emissivity by using large emissivity coating material, increasing a depth of the blackbody radiation cavity and reducing the caliber. However, the cavity blackbody radiation source of this disclosure adopts the carbon nanotube composite material as the inner surface material of the blackbody radiation cavity, the depth of the blackbody radiation cavity is greatly reduced under the same effective emissivity of the cavity, and therefore, a miniaturization of the cavity blackbody radiation source can be realized.

Third, when the plurality of carbon nanotubes remain in the upright state in the black lacquer, adjacent carbon nanotubes are nearly parallel and form a gap. When light rays are incident on the black body radiation cavity, the light rays are reflected back and forth by the adjacent carbon nanotubes in the gap, and the light rays emitted from the black body radiation cavity are greatly reduced, so an emissivity of the carbon nanotube composite material is further improved.

Fourth, the carbon nanotubes can be prepared by a chemical vapor deposition of carbon source gas under high temperature conditions, and the raw materials are cheap and easy to obtain.

Fifth, the carbon nanotubes have excellent mechanical properties. The use of carbon nanotube materials to prepare cavity blackbody radiation sources can increase the stability of the cavity blackbody radiation source, and make the star borne blackbody not easy to damage in harsh environments.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A cavity blackbody radiation source comprising:
   a blackbody radiation cavity, wherein the blackbody radiation cavity comprises an inner surface; and
   a carbon nanotube composite material located on and directly contacting the inner surface, wherein the carbon nanotube composite material consists of a black lacquer and a plurality of carbon nanotubes, and the plurality of carbon nanotubes is dispersed in and immersed in the black lacquer; and a surface of the carbon nanotube composite material which directly contacts the inner surface is defined as a first surface, a surface of the carbon nanotube composite material away from the inner surface is defined as a second surface, the second surface is opposite to the first surface, and the second surface comprises a plurality of microstructures.

2. The cavity blackbody radiation source of claim 1, wherein a shape of each of the plurality of microstructures is a strip protrusion or a dot protrusion.

3. The cavity blackbody radiation source of claim 2, wherein a cross-sectional shape of the strip protrusion is triangular, trapezoidal, or square.

4. The cavity blackbody radiation source of claim 2, wherein a cross-sectional shape of the dot protrusion is triangular, trapezoidal, or square.

5. The cavity blackbody radiation source of claim 1, wherein a mass ratio of the plurality of carbon nanotubes in the carbon nanotube composite material ranges from about 1% to about 50%.

6. The cavity blackbody radiation source of claim 5, wherein the mass ratio of the plurality of carbon nanotubes in the carbon nanotube composite material ranges from about 2% to about 10%.

7. The cavity blackbody radiation source of claim 1, further comprising a heating element located on an outer surface of the blackbody radiation cavity.

8. The cavity blackbody radiation source of claim 7, wherein the heating element comprises a carbon nanotube structure, a first electrode and a second electrode, the first electrode and the second electrode are located on a surface of the carbon nanotube structure and spaced apart from each other.

9. The cavity blackbody radiation source of claim 8, wherein the room comprises a bottom surface, and a shape of the bottom surface of the room is a flat surface, a tapered surface, or a prismatic surface.

10. The cavity blackbody radiation source of claim 1, wherein the blackbody cavity comprises a room.

11. The cavity blackbody radiation source of claim 1, wherein a material of the blackbody radiation cavity is a hard aluminum, an aluminum alloy or an oxygen-free copper.

12. The cavity blackbody radiation source of claim 1, wherein the blackbody radiation cavity comprises a blackbody cavity and a blackbody cavity bottom.

13. The cavity blackbody radiation source of claim 12, wherein the blackbody cavity and the blackbody cavity bottom is an integral structure.

14. The cavity blackbody radiation source of claim 12, wherein the blackbody cavity bottom is pressed into or screwed into the blackbody cavity from an end opening of the blackbody cavity.

15. A cavity blackbody radiation source consisting of:
a blackbody radiation cavity defining an inner surface; and
a carbon nanotube composite material located on and directly contacting the inner surface, wherein the carbon nanotube composite material consists of a black lacquer and a plurality of carbon nanotubes, and the plurality of carbon nanotubes is dispersed in and immersed in the black lacquer; and a surface of the carbon nanotube composite material which directly contacts the inner surface is defined as a first surface, a surface of the carbon nanotube composite material away from the inner surface is defined as a second surface, the second surface is opposite to the first surface, and the second surface comprises a plurality of microstructures.

\* \* \* \* \*